(No Model.) 2 Sheets—Sheet 1.

J. C. HENRY.
RECORDER OF SPEED OF DRIVEN SHAFTS.

No. 508,614. Patented Nov. 14, 1893.

Witnesses
W. A. Courtland
A. C. Orne

Inventor
John C. Henry
by Bentley & Blodgett
Attys

THE NATIONAL LITHOGRAPHING COMPANY,
WASHINGTON, D. C.

(No Model.) 2 Sheets—Sheet 2.

J. C. HENRY.
RECORDER OF SPEED OF DRIVEN SHAFTS.

No. 508,614. Patented Nov. 14, 1893.

Witnesses
Wm H. Courtland
A. O. Orne

Inventor
John C. Henry
by Bentley & Blodgett
Attys

UNITED STATES PATENT OFFICE.

JOHN C. HENRY, OF WESTFIELD, NEW JERSEY.

RECORDER OF SPEED OF DRIVEN SHAFTS.

SPECIFICATION forming part of Letters Patent No. 508,614, dated November 14, 1893.

Application filed September 10, 1892. Serial No. 445,510. (No model.)

*To all whom it may concern:*

Be it known that I, JOHN C. HENRY, a citizen of the United States, residing at Westfield, county of Union, State of New Jersey, have invented certain new and useful Improvements in Mechanism for Indicating and Recording the Speed of Driven Shafts, of which the following is a specification.

My invention relates to mechanism for indicating and recording the speed of driven shafts. It is more especially designed for use on locomotives, railway cars, and the like, the object being to provide simple and reliable mechanism for indicating to an engineer or other official the speed at which the train is running, and also for making a permanent record of the varying rates of speed at which the train has passed over the road. These results have been accomplished heretofore in various ways, but I make use of a novel arrangement of synchronously rotating electric generator and motor, the former being actuated by the driven shaft, such as an axle of the locomotive or car truck, and the latter operating the indicating and recording mechanism.

Figure 1:
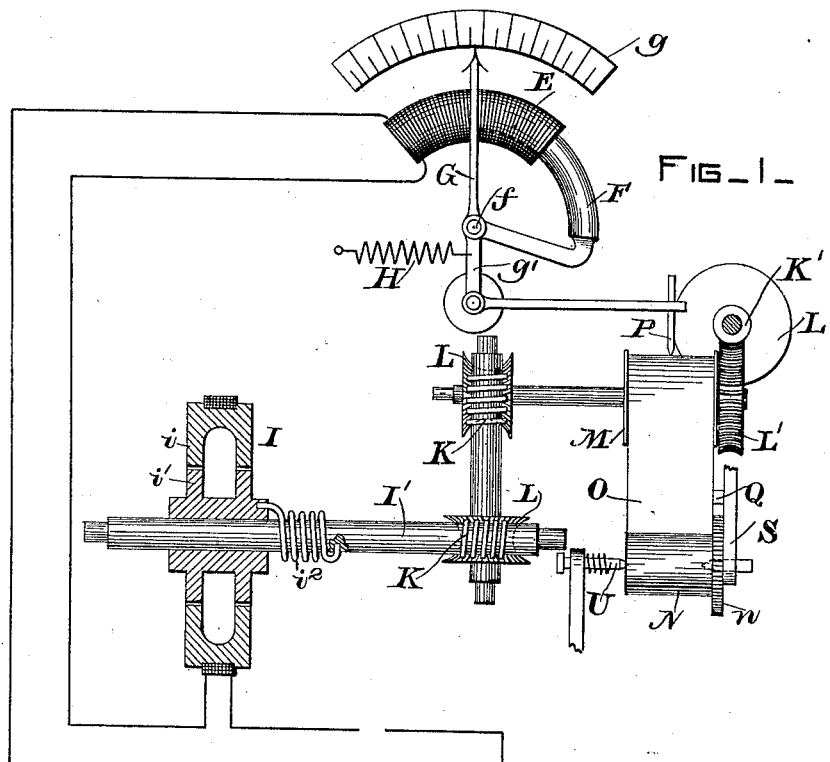
Figure 2:
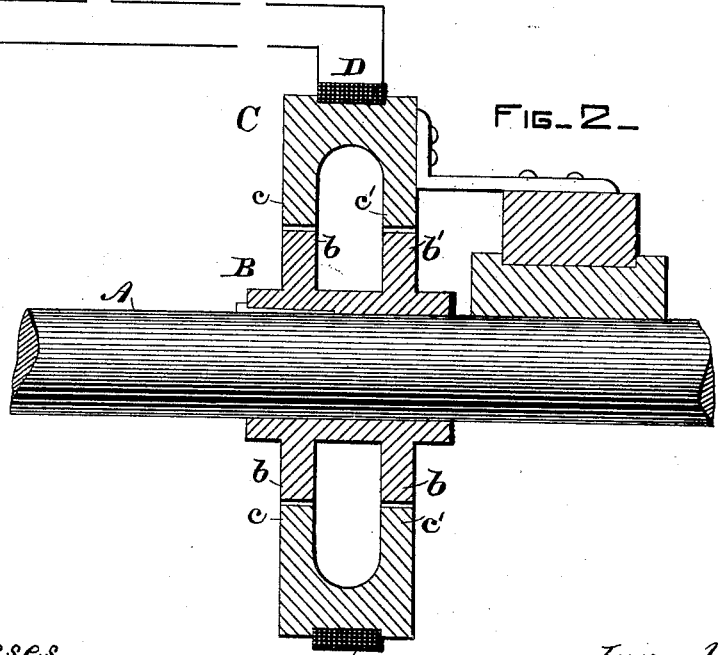
Figure 3:
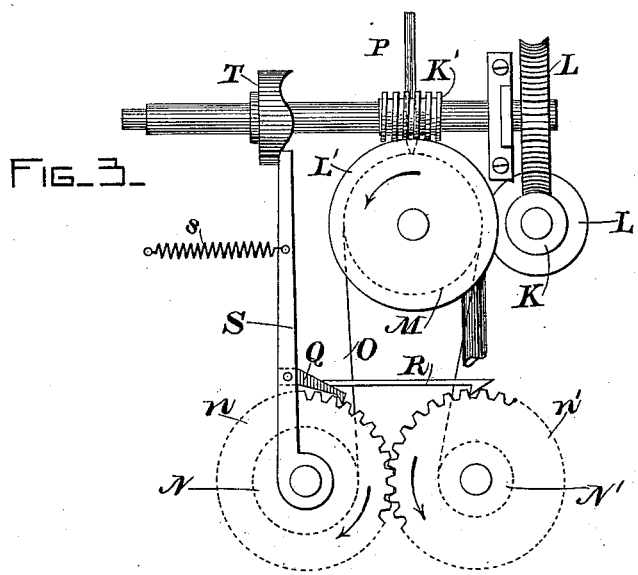
Figure 4:
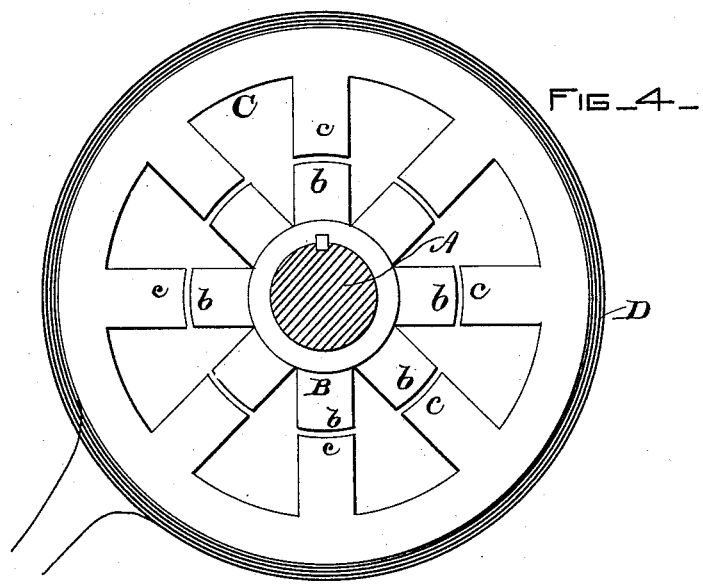
Figure 5:
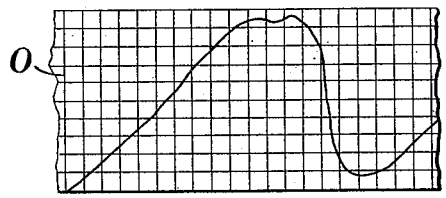

In the drawings, Figure 1 is a diagrammatic view of the indicator and recorder. Fig. 2 is a section of the generator. Fig. 3 is a side elevation of the recorder. Fig. 4 is a side elevation of the generator or motor. Fig. 5 shows a portion of the recorder produced by the machine.

The generator or dynamo is mounted on or actuated by a shaft A, such as the axle of one of the trucks of a railway train, preferably the locomotive truck whose wheels are not liable to be slid on the rails by either the brakes or the steam pressure in the cylinders.

The dynamo is preferably composed of a magnet B having an annular series of radial pole pieces $b\ b'$, and keyed securely on the axle A. The magnet constitutes a rotating field. It is preferably a permanent magnet, as shown, though it may be an electro-magnet if desired. Concentric with the magnet and surrounding it, is the stationary armature C, consisting of a ring having radial pole pieces $c\ c'$, projecting inwardly in the planes of the magnet poles $b\ b'$. A coil of insulated wire D is wrapped around the ring either externally or internally, and when the axle A turns, an alternating current of electricity is generated in said coil. This current is led to any suitable electric indicator. I prefer to use a curved solenoid E, through which the current passes, and into which is sucked the core F, pivoted on a fulcrum $f$, and carrying an index G which moves over a graduated scale or dial $g$. A spring H resists the pull of the solenoid, and returns the index to zero when the current ceases. The intensity of the current varies directly with the speed of the axle A, and as the position of the index varies with the current strength, the variations in speed are instantly shown by the index. The current is also led to a motor I, which may be in series or in shunt with the solenoid. It consists, preferably, of an annular field magnet $i$ and a rotating permanent magnetic armature $i'$, similar in construction to the dynamo. The armature is loose on the shaft I', being connected therewith by a helical spring $i^2$ to ease the starting of the motor. The shaft I' is connected by suitable gearing, preferably worms K and worm gears L, with the driving drum M of the recording mechanism. This comprises, in addition to the driving drum, two spools N N', which pay out and wind up the paper ribbon O. The record is made on this ribbon by means of a pencil P, which is moved transversely to the paper by an arm $g'$ forming an extension of the index. The ribbon is preferably ruled with longitudinal lines to indicate speed in miles per hour, and with cross lines to indicate predetermined intervals of distance run. The pencil traces a curved line, as shown in Fig. 5, which enables one to see what speed was attained at any given point during the run, for how great a distance it was maintained, and what variations in speed took place. The spools are positively driven by the intermeshing gears $n\ n'$, engaged by pawls Q R, which are pivoted to a lever S, actuated by a cam T, on one of the shafts of the winding mechanism. The gears are operated by the pawl Q when the lever is moved in one direction by the cam, and by the pawl R when the lever is retracted by its spring $s$. The cam is so shaped that the lever is actuated and the gears rotated irrespective of the direction in which the axle, motor, and worm shafts may be turning.

Since the motor is driven in synchronism with the dynamo, both having the same number of pole pieces, the revolutions of the recording mechanism vary directly with those of the axle A, though at a much reduced speed. The feeding of the paper is done by the worm K' which meshes with the gear L' on the shaft of the drum M. The spools N N' are held in frictional contact with the gears $n$ $n'$, by the spring bearing pins U, which afford a means for readily removing the spools when a new ribbon is to be inserted. The tendency of the gears is to wind the paper on to both spools N N', but since the spools have only a frictional contact with the gears, the result is that the paper is simply drawn tight over the drum M. The feeding is done wholly by the drum, and in whichever direction it may be turning, the slack is taken up by the spool toward which the paper is fed.

Various modifications in the construction and arrangement of the parts may be introduced without departing from the spirit of my invention.

What I claim as new, and desire to secure by Letters Patent, is—

1. A speed recorder comprising an electric generator actuated by the driven shaft, an electric motor adapted to run synchronously with said generator, a pencil controlled by an electrical device responding to changes in the intensity of the generator current, and a paper ribbon moved by said motor under the pencil, substantially as described.

2. A speed recorder comprising a dynamo actuated by the driven shaft, a motor in circuit therewith, a drum geared to and running synchronously with the motor for operating a paper ribbon, a solenoid in circuit with the dynamo, and a pencil actuated by the solenoid in a line transverse to the travel of the paper, substantially as set forth.

3. A speed recorder comprising an annular permanent magnet secured on the driven shaft, an annular armature surrounding said magnet, a wire coiled on said armature, a motor connected to the terminals of said wire, a pencil responding to changes in the circuit, and a paper ribbon moved under the pencil by the motor, substantially as described.

4. In a speed recorder, the combination with a dynamo comprising a rotating field magnet, consisting of an annular permanent magnet secured on a shaft and having radial pole pieces, an annular stationary armature having inwardly projecting radial poles, and a coil of insulated wire wound around said armature, of a motor adapted to run synchronously with said dynamo, comprising an annular field magnet in circuit with the dynamo armature, and an annular permanent magnetic armature mounted on a shaft and rotating inside of said field magnet, a feed drum and winding drums geared to said armature, a solenoid, in series with the dynamo, and a pencil actuated by the solenoid, substantially as described.

5. In a speed recorder, mechanism for feeding a record strip, comprising a driving drum, two winding spools, and gear wheels in frictional contact with said spools, and tending when rotated to wind the strip on both spools at once, substantially as described.

In witness whereof I have hereto set my hand this 3d day of September, 1892.

JOHN C. HENRY.

Witnesses:
JOHN M. C. MARSH,
S. E. WILCOX.